P. EVENS, Jr.
Pendulum-Scale.

No. 225,513. Patented Mar. 16, 1880.

Attest:
Joseph Warwood
Otto Zeil

Inventor.
Platt Evens, Jr.

UNITED STATES PATENT OFFICE.

PLATT EVENS, JR., OF COVINGTON, KENTUCKY.

PENDULUM-SCALES.

SPECIFICATION forming part of Letters Patent No. 225,513, dated March 16, 1880.

Application filed July 24, 1879.

*To all whom it may concern:*

Be it known that I, PLATT EVENS, Jr., of Covington, county of Kenton, and State of Kentucky, have invented a new and Improved Gravity-Scale, of which the following is a specification.

Figure 1:
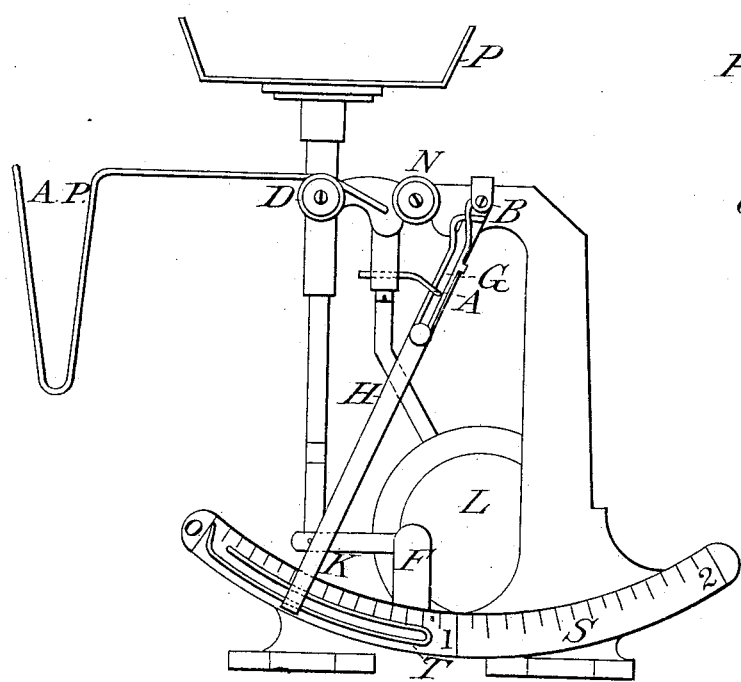
Figure 2:
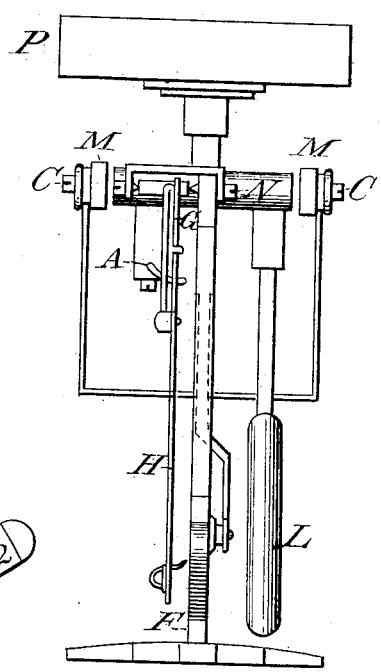
Figure 3:
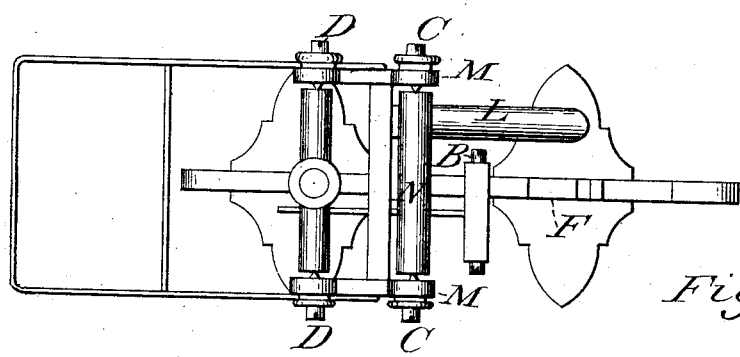

In the accompanying drawings, Figure 1 represents a vertical side view of my improved scale. Fig. 2 is a back-end view. Fig. 3 is a top view without the platform.

Similar letters of reference indicate corresponding parts.

The invention consists of a machine made of a frame supporting by pivots or hinges a lever. To a part of said lever is attached, by pivots and a strap-joint, a vibrating frame or shaft surmounted by a suitable provision to lay articles upon to be weighed; also, a finger or hand provided with an adjustable pointer so constructed and governed that the irregular motion of the lever is so compensated that the divisions upon the index or dial can be of uniform and of equal distance from each other.

Letter F, Fig. 1, is a frame, with projecting arms N. Frame M is pivoted on arms N by pivots C. On said frame M the lever L is attached, also arm A. The said lever L is a well-known device, and has been used in the construction of scales. The same is recognized by the appellation of "bent lever," and operates upon the principle that when the short arm of the lever L is depressed the same becomes shorter in a meridian line to the center C, and at the same time the long arm of the lever L becomes longer as additional weights are placed upon the platform P to be weighed.

The vibrating platform P is attached to the frame M by pivots D; also, by the strap-joint K, to the frame F.

S is a dial, graduated in equal divisions to register the weight of any article placed upon the scale or platform P.

H is a compensating finger or hand, pivoted at B on frame A, and moved to designate the weight of any substance placed upon the platform P by the arm A.

A P is an additional platform to increase the length of the short arm of the lever L for weighing very light articles.

The finger H is pivoted or hinged on frame F near the pivot C, and is moved to designate the weight of any article placed upon the platform P by the arm A, which is attached to a part of the lever L.

The pin A during the upward motion of the long arm of the lever L traverses toward the pivoted end of the finger H in the slot G, thus giving a constantly-increasing motion to the finger H.

The downward motion of the long arm of the lever L moves the finger H by the arm A at a decreasing speed, from the fact that the arm A is moving away from the pivoted end of the finger F.

In the act of weighing the lever L moves with an irregular motion the divisions upon the dial or index S. As each additional pound, ounce, or equal parts of same are placed upon the platform P to be weighed, the divisions would become less and less in a regular distance to each other, but by the use of the finger H, as heretofore described, will allow the divisions on the dial S to be of equal and uniform distances from each other, thus making the scales entirely practicable and useful in taking the "tare" or determining the weight of any article from any part of the dial S.

The adjustable pointer T, Fig. 1, on the lower end of finger H, is designed to adjust the scales, also to be used in taking the tare of any receptacle laid upon the platform P. After the said receptacle is placed upon the platform P the pointer T is moved to indicate at 0 (zero) on the dial S. From said 0 (zero) the hand H will, by pointing on the dial S, register the correct weight of any additional substance laid upon or with the receptacle.

I do not claim the lever L as a separate device, as the same is well known and has been used in the construction of machines for the purposes of obtaining the weight of substances.

What I claim, and desire to secure by Letters Patent, is—

The lever L and compensating finger or hand H, in combination with the adjustable pointer T, for the purposes described.

PLATT EVENS, JR.

Witnesses:
JOSEPH WARWOOD,
OTTO ZEIL.